(12) United States Patent
Basini

(10) Patent No.: US 10,695,836 B2
(45) Date of Patent: Jun. 30, 2020

(54) METHOD OF MANUFACTURING A HEAT EXCHANGER

(71) Applicant: HS Marston Aerospace Limited, Wolverhampton (GB)

(72) Inventor: Neil Basini, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 141 days.

(21) Appl. No.: 15/879,795

(22) Filed: Jan. 25, 2018

(65) Prior Publication Data
US 2018/0236552 A1    Aug. 23, 2018

(30) Foreign Application Priority Data

Feb. 17, 2017    (EP) ..................................... 17156783

(51) Int. Cl.
| | | |
|---|---|---|
| *B22F 3/00* | (2006.01) | |
| *B22F 3/105* | (2006.01) | |
| *F28F 13/06* | (2006.01) | |
| *F28F 19/00* | (2006.01) | |
| *F28F 21/08* | (2006.01) | |

(Continued)

(52) U.S. Cl.
CPC .............. *B22F 3/1055* (2013.01); *B22F 1/02* (2013.01); *B22F 3/20* (2013.01); *B29C 64/205* (2017.08); *B33Y 10/00* (2014.12); *B33Y 30/00* (2014.12); *B33Y 80/00* (2014.12); *F28F 3/12* (2013.01); *F28F 7/02* (2013.01); *F28F 13/06* (2013.01);

(Continued)

(58) Field of Classification Search
CPC .. B22F 3/1055; B22F 3/20; B22F 1/02; B22F 2207/01; B22F 2003/1057; B22F 7/06; B22F 2999/00; B22F 2998/10; B22F 2998/00; B29C 64/205; B29C 33/02; B29C 33/3842; B29C 41/20; B29C 64/153; B29C 64/118; B29C 64/165; B33Y 10/00; B33Y 80/00; B33Y 30/00; F28F 21/084; F28F 21/086; F28F 7/02; F28F 3/12; F28F 13/14; F28F 21/081; F28F 19/00; F28F 13/06;

(Continued)

(56) References Cited

U.S. PATENT DOCUMENTS

| | | |
|---|---|---|
| 6,656,409 B1 | 12/2003 | Keicher et al. |
| 7,020,539 B1 | 3/2006 | Kovacevic et al. |

(Continued)

OTHER PUBLICATIONS

Extended European Search Report for International Application No. 17156783.7 dated Aug. 14, 2017, 12 pages.

(Continued)

*Primary Examiner* — Jun S Yoo
(74) *Attorney, Agent, or Firm* — Cantor Colburn LLP

(57) ABSTRACT

A method of manufacturing a heat exchanger comprising a body and a support embedded within the body. The support comprises a different material and/or a different material structure to the body and hence has at least one material property which is different to that of the body. The method comprises; forming at least a first portion of the support with a first material and a first material structure using a first additive manufacturing step; and forming at least a first portion of the body with a second material and a second material structure using a second additive manufacturing step. The first material is different to the second material and/or the first material structure is different to the second material structure.

8 Claims, 2 Drawing Sheets

(51) Int. Cl.
*F28F 13/14* (2006.01)
*F28F 3/12* (2006.01)
*F28F 7/02* (2006.01)
*B33Y 30/00* (2015.01)
*B33Y 80/00* (2015.01)
*B33Y 10/00* (2015.01)
*B22F 1/02* (2006.01)
*B29C 64/205* (2017.01)
*B22F 3/20* (2006.01)
*B22F 7/06* (2006.01)

(52) U.S. Cl.
CPC .............. *F28F 13/14* (2013.01); *F28F 19/00* (2013.01); *F28F 21/081* (2013.01); *F28F 21/084* (2013.01); *F28F 21/086* (2013.01); *B22F 7/06* (2013.01); *B22F 2003/1057* (2013.01); *B22F 2207/01* (2013.01); *B22F 2998/00* (2013.01); *B22F 2998/10* (2013.01); *B22F 2999/00* (2013.01); *F28F 2225/00* (2013.01); *F28F 2255/18* (2013.01)

(58) Field of Classification Search
CPC ..... F28F 2225/00; F28F 2255/18; B05B 7/14; B23K 26/34; B23K 26/342; B23K 26/32
See application file for complete search history.

(56) References Cited

U.S. PATENT DOCUMENTS

| | | | |
|---|---|---|---|
| 7,810,552 B2 | 10/2010 | Slaughter | |
| 7,866,372 B2 | 1/2011 | Slaughter | |
| 7,866,377 B2 | 1/2011 | Slaughter | |
| 8,359,744 B2 | 1/2013 | Hislop et al. | |
| 10,443,437 B2* | 10/2019 | Lacy | F01D 25/12 |
| 2003/0206820 A1* | 11/2003 | Keicher | B05B 7/14 |
| | | | 419/9 |
| 2015/0201500 A1 | 7/2015 | Shinar et al. | |
| 2016/0158842 A1* | 6/2016 | Urbanski | F04D 29/624 |
| | | | 427/264 |
| 2016/0230595 A1 | 8/2016 | Wong et al. | |

OTHER PUBLICATIONS

Michael Ott: "Multimaterialverarbeitung bei der additiven strah— und pulverbettbasierten Fertigung" In: "Dissertation", Feb. 14, 2012, Utz, Munchen, DE, Part 1, 118 pages.

Michael Ott: "Multimaterialverarbeitung bei der additiven strahl— und pulverbettbasierten Fertigung" In: "Dissertation", Feb. 4, 2012, Utz, Munchen, DE, Part 2, 82 pages.

* cited by examiner

METHOD OF MANUFACTURING A HEAT EXCHANGER

This application claims priority to European Patent Application No. 17156783.7 filed Feb. 17, 2017, the entire contents of which is incorporated herein by reference.

The present invention relates to a method of manufacturing a heat exchanger, particularly a method of manufacturing a heat exchanger comprising additive manufacturing.

Heat exchangers are subject to high temperatures and pressures, and consequently can suffer from thermally-induced stresses and issues with pressure containment such as fatigue, cracking, and leaking. Different regions of heat exchangers are subject to different temperatures and pressures, and as such regions which experience the highest temperatures and pressures are more susceptible to fatigue and ultimately to failure.

According to a first aspect of the present invention there is provided a method of manufacturing a heat exchanger comprising a body and a support embedded within the body, wherein the support comprises a different material and/or a different material structure to the body and hence has at least one material property which is different to that of the body, the method comprising; forming at least a first portion of the support with a first material and a first material structure using a first additive manufacturing step; and forming at least a first portion of the body with a second material and a second material structure using a second additive manufacturing step; wherein the first material is different to the second material and/or the first material structure is different to the second material structure.

The support is made of a different material and/or has a different material structure to the body, so that the support may behave differently to the body in response to, for example, applied heat and/or forces. For example, the structure may comprise a material with a higher thermal conductivity than the body, so that the structure may transfer heat more quickly than does the body. By embedding such a structure within the body, it is possible to transfer heat away from high risk areas more quickly than the body alone would do.

The use of two additive manufacturing steps permits geometries and arrangements of the support and body that would otherwise not be possible. The support may be shaped such that it could not be filled after manufacture of the body is complete, for example by pouring a molten material into an empty channel within the body. For example, the support may comprise portions which would not be reached by molten flow under gravity. The support may comprise portions of a width too small to permit molten metal to flow through. The geometry of the support may therefore be complicated and intricate, comprising portions of strands which are gridded, meshed, woven, or the like.

The use of two additive manufacturing techniques also enables bonding of the support to the body during formation, thereby enhancing contact between them and increasing e.g. strength, stiffness, or heat transfer therebetween.

The structure may be stronger and/or stiffer than the body, so as to provide an increased mechanical support against wear and fatigue of the heat exchanger, and/or an improved capability to cope with pressure containment. By embedding such a structure within the body, it possible to increase the strength and/or stiffness of the heat exchanger to a greater degree than would be the case for the body alone.

The first additive manufacturing step may use a first additive manufacturing technique and the second additive manufacturing step may use a second additive manufacturing technique that is different to the first additive manufacturing technique.

The different material property of the structure and the body may be a consequence of different additive manufacturing techniques. The material structure of the support may be different to that of the body, for example the microstructure of the support may differ to that of the body, or the macro-structure of the support may differ to that of the body. The first and second additive manufacturing steps may result in different micro- and/or macro-structures and consequently in different material properties, for example with regard to thermal or mechanical behaviour or the like. If the same material is used for both the support and the body, then the different material properties of the support and the body may be a result of differences in the first and second additive manufacturing steps.

The different material property may be thermal conductivity. Thermal conductivity is a measure of a material's ability to conduct heat. The support may have a larger thermal conductivity than the body. The support may have a thermal conductivity about 20% greater than that of the body, or more. The support may provide a 50% to 100% increase in thermal conductivity over the body, or more. The support may conduct heat more effectively than the body, spreading heat throughout the heat exchanger and dissipating concentrations of heat from at-risk regions.

The different material property may be strength. The strength of a structure is a measure of its ability to withstand an applied load/force without failure or plastic deformation. The support may have an increased strength as compared to the body, and may therefore increase the overall strength of the heat exchanger. The support may have a strength about 20% greater than that of the body, or more. The strength may be any or all of yield strength, compressive strength, tensile strength, fatigue strength, and impact strength.

The different material property may be stiffness. The stiffness of a structure is a measure of its rigidity i.e. the extent to which it resists deformation in response to an applied force. The support may have a stiffness greater than that of the body and therefore may increase the overall stiffness of the heat exchanger. The support may have a stiffness about 20% or more greater than that of the body. The support may have a stiffness of 50% to 100% greater than that of the body, based on the Young's modulus.

The support may have a stiffness less than that of the body and therefore may decrease the overall stiffness of the heat exchanger. The support may a stiffness about 20% or more less than that of the body. The support may have a stiffness of 50%-100% less than that of the body, based on the Young's modulus.

The different material property may be electrode potential. The support being fully enclosed within the body may then help prevent galvanic corrosion.

The use of a support and body as described may provide an overall decrease in the weight of the heat exchanger. The same strength and/or thermal conductivity achieved may be equivalent to that obtained using a heat exchanger formed of a single material. The support may increase the strength of a body that would otherwise not be strong enough for its intended purpose. The support may increase the thermal conductivity of a body that would otherwise not be thermally conductive enough for its purpose. It may therefore be possible to use lighter and/or less dense materials to form part or all of the heat exchanger or body, thereby reducing the overall weight or density of the heat exchanger.

The support may therefore be formed so as to provide desired material properties and behavioural characteristics different to those of the body in order to control the material properties and behaviour of the heat exchanger. The heat exchanger may therefore be made more durable, better able to withstand temperature differentials, and/or pressures, by use of the embedded support.

The level of control over the shape and arrangement of the support afforded by additive manufacturing may allow thus the manufacture of heat exchangers with drastically increased properties. The support may be shaped for enhanced strength, as well as for example being made of a material with enhanced strength. For example, the support may be formed as a truss or other beam type structure, such as an I or T cross-section beam, to thereby enhance the structural characteristics of the heat exchanger by acting as an internal beam. The structure may comprise segments which are triangular, or strands which are woven, or meshed. The support may comprise a plurality of physically separate portions within the body. Therefore, by using only small amounts of material for the structure, which materials may be too expensive to use for forming the body of the heat exchanger, the performance of the heat exchanger as a whole may be improved.

The first additive manufacturing technique may be a type of extrusion additive manufacturing, wherein material is extruded at a desired location to form a layer of the product being manufactured. Consecutive layers are then added to the first and built up so as to form the final product. For example, the first additive manufacturing technique may be fused deposition modelling (FDM), fused filament fabrication (FFF), laser cladding (LC), laser deposition (LD), or the like. In FDM and FFF, strings of molten material are extruded so as to form a layer of the product being formed. In LC and LD, a stream of a desired material powder is fed into a focused laser beam as it is scanned across a target surface, leaving behind a deposited coating of the chosen material.

The second additive manufacturing technique may be a powder bed process. In such processes, a desired material powder (e.g. a metal) is heated at a desired location so as to weld the metal powder particles together. A layer of the desired product is formed first by such welding, then consecutive layers are added thereto for form the final product. For example, the second additive manufacturing technique may be direct metal laser sintering (DMLS), electron beam melting (EBM) or the like.

Alternatively, the first additive manufacturing technique may be a powder bed process, and the second additive manufacturing technique may be a FDM process. Alternatively, both first and second additive manufacturing techniques may be the same, and the material used in the first and second additive manufacturing steps may be different or may have a different material structure so as to give the structure and the body different material properties.

The second additive manufacturing step may bond the first portion of the body to the first portion of the support. Thus the support may be embedded within and fused to the body, despite different additive manufacturing steps or techniques being used for form the support and the body. The material(s) may be selected for their ability to fuse together in this way.

The support may be formed of a suitable metal or metal alloy for its desired purpose, and the body may be formed of a suitable metal or metal alloy for its desired purpose taking into consideration the relevant material properties of the material forming the support. In this disclosure, references to a particular metal are intended also to refer to the relevant alloys of that metal and in particular to alloys comprising that metal as a main constituent.

The support may comprise copper and/or the body may comprise aluminium. The support may comprise copper and/or the body may comprise steel. The support and body may respectively each be formed entirely of those metals or of alloys of those metals. These combinations may increase the thermal conductivity of the heat exchanger.

The support may comprise steel and/or the body may comprise aluminium. The support may comprise titanium and/or the body may comprise aluminium. The support and body may respectively each be formed entirely of those metals or of alloys of those metals. These combinations may increase the strength of the heat exchanger.

The step of forming at least a first portion of the body may comprise; providing a powder coating about the first portion of the support; and melting the powder to form the portion of the body. The melted powder may thus be fused/welded to the support during formation.

The method may comprise forming a second portion of the support using the first additive manufacturing step after forming the first portion of the body using the second additive manufacturing step; and forming a second portion of the body using the second additive manufacturing step after forming the second portion of the support using the first additive manufacturing step. Thus the method may comprise alternately forming consecutive layers of the support and body, so that the entire heat exchanger is formed in layers. That is, the method may comprise repeating the steps of forming a portion of the support using a first additive manufacturing step, and forming a portion of the body using a second additive manufacturing step, so that the method forms layers of the heat exchanger with the support embedded within the body.

The method may comprise machining the first portion of the support and/or machining the first portion of the body, and may comprise machining the first portion of the support and/or machining the first portion of the body after forming the first portion and before forming the second portion. That is, a layer of the heat exchanger may be machined, for example to remove imperfections, before a subsequent layer is added. The machining may be computer numeric control (CNC) machining or the like.

The method may comprise machining the second portion of the support and/or machining the second portion of the body, and may comprise doing so after forming the second portion and before forming a third portion. That is, each layer of the heat exchanger may be machined before a subsequent layer is added. The heat exchanger may be machined once all the layers have been added.

The method may comprise, after the support has been fully formed, forming a further portion of the body so as to completely enclose the support within the body. Forming the further portion of the body may comprise forming multiple layers of the body using the second additive manufacturing step.

The method may comprise providing a controlled atmosphere within a chamber, within which chamber the heat exchanger is formed. The method may comprise choosing the materials to form the support and the body with electrode potentials so as to avoid galvanic corrosion during manufacture and/or during later use of the heat exchanger.

According to a second aspect of the present invention there is provided a heat exchanger manufactured by a method according to the first aspect, the heat exchanger comprising a body and a support embedded within the body, wherein the support comprises a different material and/or a different material structure to the body.

According to a third aspect of the present invention there is provided an additive manufacturing system for manufacturing a heat exchanger comprising a body and a support embedded within the body, wherein the support comprises a different material and/or a different material structure to the body and hence has at least one material property which is different to that of the body, the system comprising; a first additive manufacturing device for performing a first additive manufacturing step for forming at least a first portion of the support with a first material and/or a first material structure; and a second additive manufacturing device for performing a second additive manufacturing step for forming at least a first portion of the body with a second material and/or a second material structure; wherein the first material is different to the second material and/or the first material structure is different to the second material structure.

The additive manufacturing system may include two additive manufacturing devices. The devices may be separate and each alone may be fully capable of forming an object by additive manufacturing. The two additive manufacturing devices may share certain components during manufacture. For example they may share a powder bed, or a chamber containing a controlled atmosphere.

The first additive manufacturing device may be a fused deposition modelling device. The second additive manufacturing device may be powder bed additive manufacturing device, for example a direct laser metal sintering additive manufacturing device or an electron beam melting additive manufacturing device.

The additive manufacturing system may comprise an arrangement for machining of a part formed by either the first or second arrangements. For example, the system may comprise a computer numeric controlled machining device.

The first and second additive manufacturing devices may be arranged to be used alternately and repeatedly to build up a support and a body according to the second aspect of the invention.

The system may be configured and arranged to perform a method as discussed above in relation to the first aspect, and may be used to manufacture a heat exchanger as discussed above in relation to the second aspect.

The term "support" as used in this application is intended to refer to a structure different to and within the body, which is formed by a the first additive manufacturing step, and has at least a different material and/or material property to the body. The support may or may not therefore provide mechanical reinforcement. The term "skeleton" could also be used in place of the term support in some example implementations.

An embodiment of the invention is described in detail below by way of example only and with reference to the accompanying drawings in which.

Figure 1A:
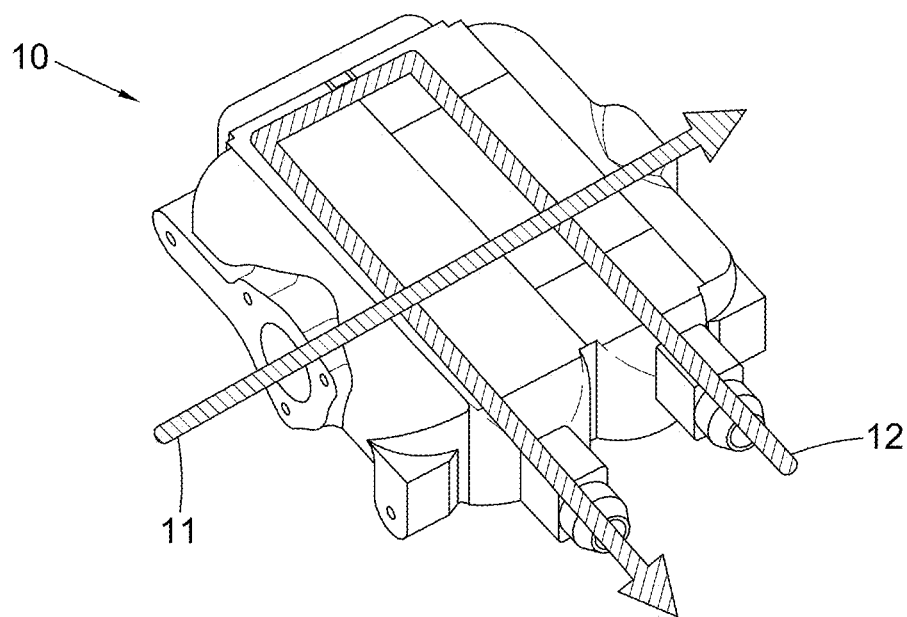
FIG. 1A shows a heat exchanger with fluid flows indicated.
Figure 1B:
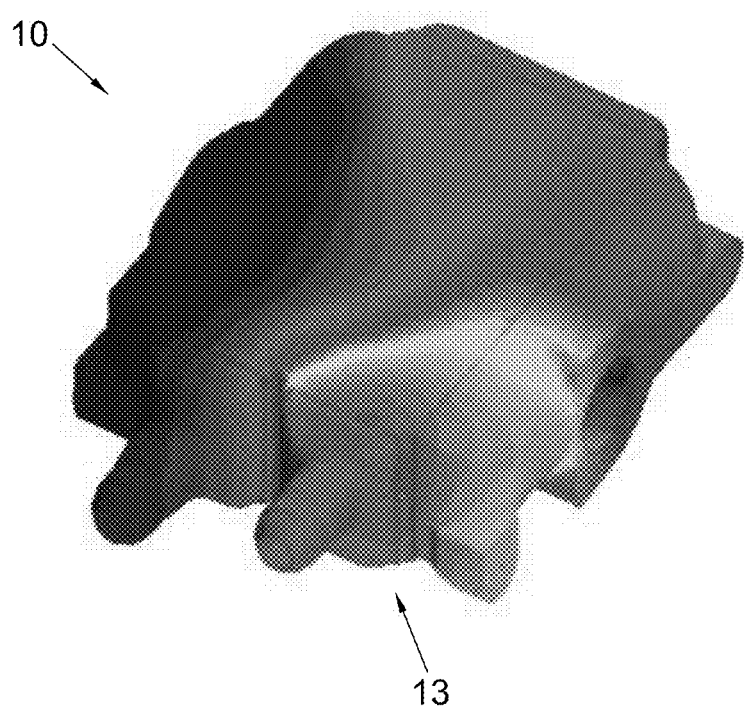
FIG. 1B shows a thermal map of the heat exchanger of FIG. 1A.

FIG. 1A shows a perspective view of a heat exchanger 10, with a cold fluid flow 11 and a hot fluid flow 12 passing therethrough so as to exchange heat. FIG. 1B shows thermal image of the same heat exchanger 10. During use the region of the heat exchanger 10 where the hot fluid flow 12 enters is at a significantly higher temperature than the rest of the heat exchanger 12. Such concentrations of heat in specific regions can lead to failure of the heat exchanger due to thermal and mechanical stresses.

Figure 2:
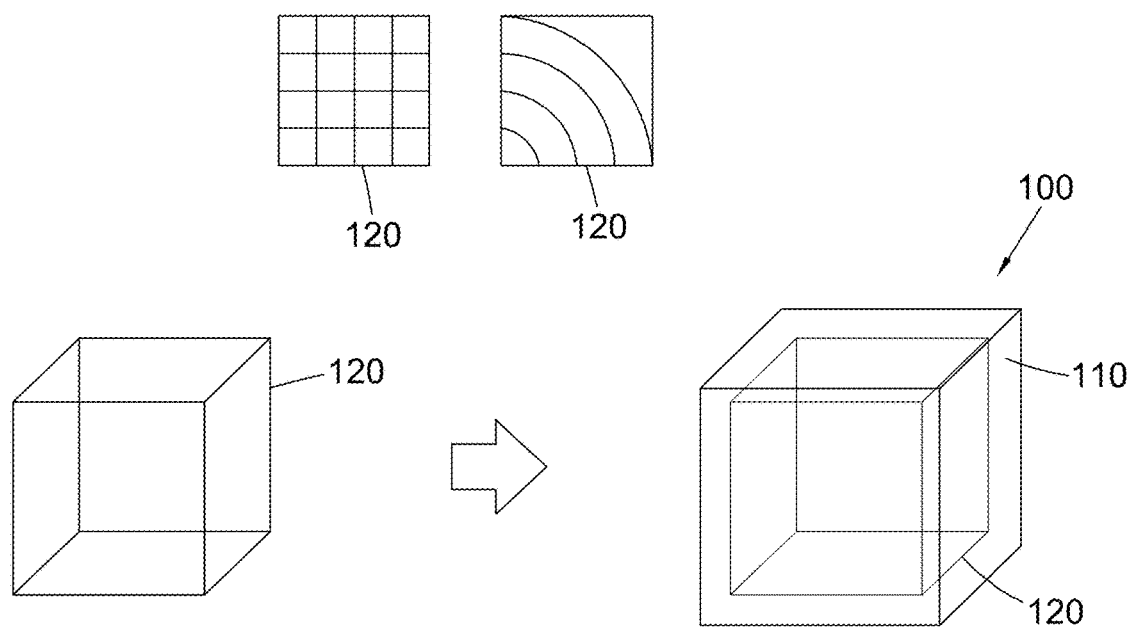
FIG. 2 shows a schematic of a support, and a schematic of the same support disposed within a body.

FIG. 2 shows a heat exchanger 100 comprising a body 110 and an embedded support 120. The support 120 can be shaped as required to be embedded within the body 110 of the heat exchanger. The support 120 is shown as defining the edges of a cube, though a grid, or concentric circular, or radial arrangement for the support 120 may also be suitable for a desired purpose. Two such alternatives are shown at the top of FIG. 2. As can be seen from FIG. 2, the support 120 is shaped as necessary to complement the geometry of the heat exchanger body 110. In the depicted case, the support 120 defines the edges of a cube, while the body 110 defines a larger cube, in which the support 120 is embedded.

The body 110 shown in FIG. 2 is solid, with the support 120 embedded therein and fused thereto. However, the body 110 and support 120 can be formed by additive manufacturing so that the necessary channels for fluid flow are also defined therein.

The material making up the support 120 of FIG. 2 is more costly than the material making up the body 110. In this example the support 120 comprises titanium (which may be as a titanium alloy) and the body 110 comprises aluminium (which may be as an aluminium alloy). The support 120 has a higher heat conductivity than does the body 110. Therefore, if a corner of the body 110 is heated, the heat will be conducted transmitted through the body 110 into the support 120. The support 120 will then conduct the heat at a faster rate than does the body 110, dissipating the heat throughout the entire heat exchanger 100 more rapidly than the material of the body 110 is capable of doing.

The support 120 is also stronger and stiffer than the material of the body 110. The heat exchanger 100 thus has improved mechanical strength and stiffness, and is hence more durable.

The support 120 is entirely contained within the body 110 and no part is exposed to the external environment. The issues of galvanic corrosion associated with dissimilar metals contacting each other can therefore be avoided.

Figure 3:
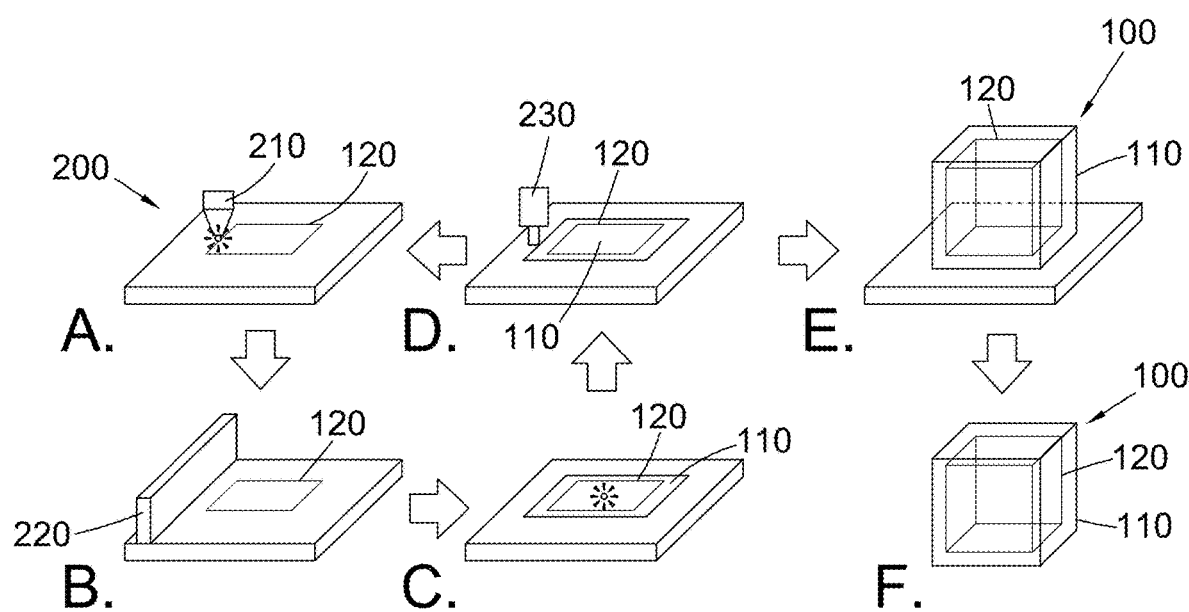
FIG. 3 shows a schematic of a process of manufacturing a heat exchanger.

FIG. 3 shows various stages A to F of a method of manufacturing a heat exchanger 100. The method is carried out using an additive manufacturing system 200. At stage A, a first portion of the support 120 is formed by a fused deposition modelling device 210. At stage B a powder coating is applied to around the portion of the support 120 by a powder bed additive manufacturing device 220. In stage C the powder is fused to form a portion of the body 110. The portion of the body 110 is fused to the portion of the support 120. At stage D, the portion of the heat exchanger 100 comprising the portion of the support 120 and the portion of the body 110 is machined using computer numeric control machining.

Depending on whether the heat exchanger is completed, the method may return to stage A or progress to stage E. If the heat exchanger is not complete, the method returns to stage A and another portion of the support 120 is formed by the fused deposition modelling device 210, followed by another portion of the body 110 formed by the powder bed additive manufacturing device 220. Another layer of the heat exchanger 100 is thus formed. The heat exchanger 100 shown in FIG. 3 comprises a plurality of layers, and hence repetition of stages A to D is needed a plurality of times.

Once the support 120 is completed, stage A may be skipped so that consecutive layers of the body 110 are formed in order to embed the support 120 within the body 110 and close the support 120 off from the atmosphere.

Once the heat exchanger 100 is complete, the method progresses to stage E in which the completed heat exchanger 100 is finished. In stage F the heat exchanger 100 is removed from the additive manufacturing system 200 and is ready to use.

While FIGS. 2 and 3 show a schematic heat exchanger, the support 120 may be formed in any shape as needed to be disposed within the body 110. For example, the heat exchanger shown in FIG. 1A might have a support 120 radiating in all dimensions away from the point of entry of the hot fluid flow 12 so as to increase the distribution of heat from that region. The support 120 may be disposed in a U-shape about the hot fluid flow 12 along its entire length within the body 110 of the heat exchanger 100. The support 120 may be shaped for enhanced strength and/or stiffness. For example it may be formed as a truss or other beam type structure, such as an I or T cross-section, to thereby enhance the structural characteristics of the heat exchanger by acting as an internal beam. The desired shape of the support 120 will be determined by the design of the heat exchanger 100 in which it is embedded.

The invention claimed is:

1. A method of manufacturing a heat exchanger comprising a body and a support embedded within the body, wherein the support comprises a different material and/or a different material structure to the body and hence has at least one material property which is different to that of the body, the method comprising;
    forming at least a first portion of the support with a first material and a first material structure using a first additive manufacturing step; and
    forming at least a first portion of the body with a second material and a second material structure using a second additive manufacturing step;
    wherein the first material is different to the second material and/or the first material structure is different to the second material structure;
    wherein the first additive manufacturing step uses a first additive manufacturing technique, and the second additive manufacturing step uses a second additive manufacturing technique which is different to the first additive manufacturing technique;
    wherein the first additive manufacturing step comprises an extrusion additive manufacturing process; and
    wherein the second additive manufacturing step comprises a powder bed process.

2. The method as claimed in claim 1, wherein the step of forming at least a first portion of the body comprises;
    providing a powder coating about the first portion of the support; and
    melting the powder to form the portion of the body.

3. The method as claimed in claim 1, comprising;
    forming a second portion of the support using the first additive manufacturing step after forming the first portion of the body using the second additive manufacturing step; and
    forming a second portion of the body using the second additive manufacturing step after forming the second portion of the support using the first additive manufacturing step.

4. The method as claimed in claim 1, comprising machining the first portion of the support and/or machining the first portion of the body.

5. The method as claimed in claim 1, comprising, after the support has been fully formed, forming a further portion of the body so as to completely enclose the support within the body.

6. The method as claimed in claim 1, comprising
    forming the support so that it has a greater thermal conductivity than the body; and/or
    forming the support so that it has a greater strength and/or stiffness than the body.

7. The method as claimed in claim 1, comprising selecting a material to form the first portion of the support and selecting a different material to form the first portion of the body so as to prevent galvanic corrosion of the body and support.

8. The method as claimed in claim 1, comprising forming at least a portion of the support as an internal beam.

* * * * *